US008720216B1

(12) United States Patent
Said et al.

(10) Patent No.: US 8,720,216 B1
(45) Date of Patent: May 13, 2014

(54) HYBRID AQUA-AMMONIA AND LITHIUM BROMIDE-WATER ABSORPTION CHILLER

(71) Applicant: King Fahd University of Petroleum and Minerals, Dhahran (SA)

(72) Inventors: Syed A. M. Said, Dhahran (SA); Maged A. I. El-Shaarawi, Dhahran (SA); Muhammad Umar Siddiqui, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/043,745

(22) Filed: Oct. 1, 2013

(51) Int. Cl.
F25B 27/00 (2006.01)
(52) U.S. Cl.
USPC ............... 62/238.3; 62/481; 62/513; 62/113
(58) Field of Classification Search
USPC ................................................ 62/481, 238.3
See application file for complete search history.

(56) References Cited

U.S. PATENT DOCUMENTS

| | | | |
|---|---|---|---|
| 3,204,425 A | 9/1965 | Rush | |
| 4,205,529 A | 6/1980 | Ko | |
| 4,280,331 A | 7/1981 | Yoshii et al. | |
| 4,311,024 A | 1/1982 | Itoh et al. | |
| 4,327,555 A | 5/1982 | Dimon | |
| 4,441,332 A * | 4/1984 | Wilkinson | 62/238.3 |
| 4,732,008 A | 3/1988 | DeVault | |
| 5,177,979 A * | 1/1993 | Gianfrancesco | 62/335 |
| 5,548,971 A | 8/1996 | Rockenfeller et al. | |
| 5,653,116 A | 8/1997 | Erickson et al. | |
| 6,584,801 B2 | 7/2003 | Erickson | |
| 6,718,792 B1 | 4/2004 | Sarkisian et al. | |
| 2010/0275629 A1 | 11/2010 | Erickson | |
| 2011/0173998 A1 | 7/2011 | Coleman et al. | |
| 2012/0011886 A1 | 1/2012 | Shiflett et al. | |

FOREIGN PATENT DOCUMENTS

JP 2004012026 A 1/2004

OTHER PUBLICATIONS

STIC—NPL Search; obtained in Nov. 26, 2013.*
Soteris Kalogirou, "Recent Patents in Absorption Cooling Systems", Recent Patents on Mechanical Engineering 2008, 1, 58-64.

* cited by examiner

*Primary Examiner* — Lakiya Rogers
*Assistant Examiner* — Orlando E Aviles Bosques
(74) *Attorney, Agent, or Firm* — Richard C Litman

(57) ABSTRACT

The hybrid aqua-ammonia and lithium bromide-water absorption chiller is an aqua-ammonia absorption refrigeration system integrated with a lithium bromide-water absorption refrigeration system. By integrating a solar-powered lithium bromide-water absorption refrigeration system into the aqua-ammonia absorption refrigeration system, evaporator temperatures below the freezing point of water may be generated at lower operating pressures and lower generator temperatures than in conventional aqua-ammonia absorption refrigeration systems.

12 Claims, 1 Drawing Sheet

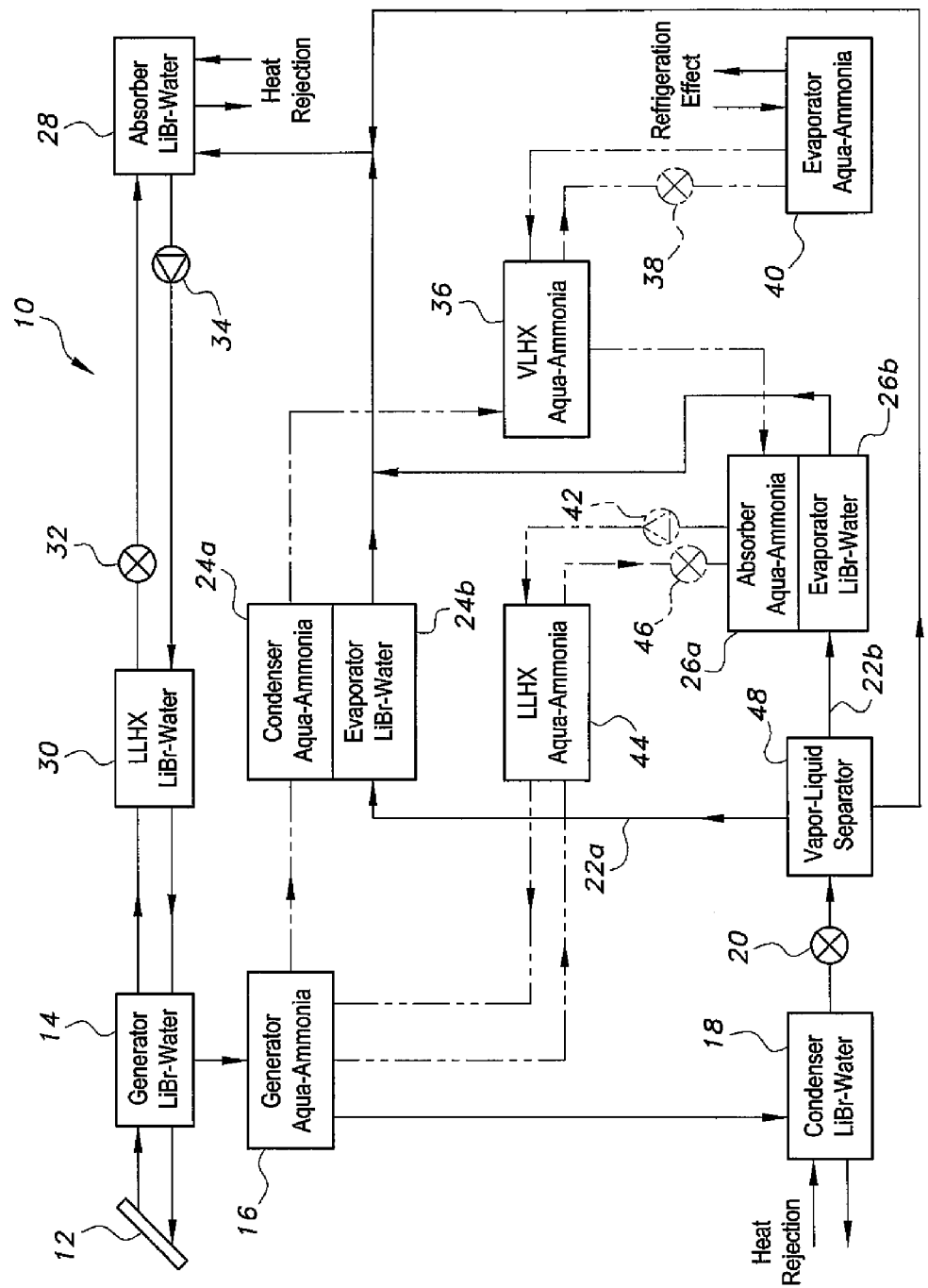

HYBRID AQUA-AMMONIA AND LITHIUM BROMIDE-WATER ABSORPTION CHILLER

BACKGROUND OF THE INVENTION

1. Field of the Invention

The present invention relates to liquid/vapor absorption refrigeration systems, and particularly to a hybrid aqua-ammonia and lithium bromide-water absorption chiller.

2. Description of the Related Art

Liquid/vapor absorption systems using ammonia refrigerant, often referred to as aqua-ammonia systems, typically utilize absorber heat exchange or generator/absorber heat exchange (GAX) cycles carried out in absorption refrigeration chillers for cooling, typically in the form of a chilled water supply directed to a hydronic loop cooperating with an indoor coil and other heat exchange components for transferring the cooling effect to a space to be conditioned. The basic components of such a chiller apparatus include an absorber, generator, condenser and evaporator, along with the necessary piping for the ammonia refrigerant and the water-based absorption fluid. Heat for the generator is typically supplied by a burner, and a circulating pump is required for directing the absorption fluid through the apparatus components.

The generator of a typical aqua-ammonia absorption system operates as a distillation column and typically includes a boiler, a stripping section or stripper, and a rectifying section. The composition feed to the generator is an ammonia-rich liquor from the system absorber, which is introduced to the generator at one or more feed or inlet points. The boiler is designed to produce liquid and vapor counter-flow coincident with heat input. Prime heat is introduced over a finite length or height of the boiler, resulting in a significant change in ammonia concentration in the area of heat input.

The stripping section includes all sections of the generator column that are below the highest (i.e., coldest) feed point. In the stripping section, heat is recovered from solution, leaving the bottom of the distillation column, the recovered heat being returned to the portion of the column above the boiler. The stripping section includes three portions, including a solution-heated-desorber (SHD), either an adiabatic desorber or a generator-absorber heat exchange (GAX) desorber, and the boiler. The SHD is the portion of the stripping section that extracts heat from weak solution, i.e., the solution from the bottom of the generator column, before the weak solution is routed to the absorber. The adiabatic desorber of the stripping section has no heat input and is typically located between the coldest feed point and the SHD. The GAX desorber receives heat from the absorber, either by heat transfer using weak liquor from the bottom of the generator column or from a secondary fluid. Typically, a generator in a GAX aqua-ammonia absorption system will have a GAX desorber or an adiabatic desorber, but not both. When the system utilizes strong liquor GAX, an adiabatic section is used, whereas a GAX desorber is used for weak liquor GAX or secondary fluid GAX.

The feed to the generator column from the system absorber is a rich liquor, which is a solution having a comparatively high ammonia content. Such rich liquor typically has 40% to 50% ammonia, but under some operating conditions, the ammonia content may be as low as about 20%. Such a rich liquor is contrasted to a weak liquor directed from the generator to the absorber, which is a water-rich composition having between about 1% and about 15% ammonia at rating conditions, and typically between about 3% and about 5% ammonia. In conventional strong-liquor GAX absorption cycles, heat is recovered by passing a portion of the strong liquor through a heat exchanger in the GAX absorber, and heating the solution above its bubble point so that it becomes a two-phase mixture. The portion of the strong liquor not passed through the GAX heat exchanger is introduced into the generator at or near the bottom of the rectifier as a single-phase liquid at or below the bubble point temperature. The second feed stream to the generator is that portion of the strong liquor that is passed through the GAX absorber. The second feed stream, comprising liquid and vapor, is introduced into the generator at a lower location than the first single-phase liquid feed. Thus, conventional strong liquor GAX is not separated into liquid and vapor components, but is introduced into the generator together at a common point.

Aqua-ammonia absorption chillers are limited in their applications due to relatively high generator temperatures and high operating pressures when used to produce evaporator temperatures below 0° C. It would be desirable to adapt the versatility and relative simplicity of the aqua-ammonia absorption chiller to applications where temperatures below 0° C. could be achieved, preferably with lower operating pressures and generator temperatures.

Thus, a hybrid aqua-ammonia and lithium bromide-water absorption chiller solving the aforementioned problems is desired.

SUMMARY OF THE INVENTION

The hybrid aqua-ammonia and lithium bromide-water absorption chiller is an aqua-ammonia absorption refrigeration system integrated with a lithium bromide-water absorption refrigeration system. By integrating a solar-powered lithium bromide (LiBr)-water absorption refrigeration system into the aqua-ammonia absorption refrigeration system, evaporator temperatures below the freezing point of water may be generated at lower operating pressures and lower generator temperatures than in conventional aqua-ammonia absorption refrigeration systems.

In operation, a solar-powered LiBr-water generator is provided for receiving a LiBr-water solution having a first LiBr concentration, where the LiBr-water generator evaporates water from the LiBr-water solution having the first LiBr concentration to output water vapor and a LiBr-water solution having a second LiBr concentration, the second LiBr concentration being greater than the first LiBr concentration (i.e., the second solution is a high concentration LiBr liquor and the first solution is a low concentration LiBr liquor). An aqua-ammonia generator is in fluid communication with the LiBr-water generator, such that the aqua-ammonia generator receives the water vapor, extracts thermal energy therefrom to partially condense the water vapor, and outputs a water vapor-liquid mixture. An aqua-ammonia solution having a first ammonia concentration is provided, the aqua-ammonia generator being configured for evaporating ammonia from the aqua-ammonia solution to output ammonia vapor. An aqua-ammonia solution having a second ammonia concentration is further provided, such that the second ammonia concentration is lower than the first ammonia concentration (i.e., the first ammonia solution is a high concentration ammonia liquor and the second ammonia solution is a low concentration ammonia liquor).

A LiBr-water condenser is in fluid communication with the aqua-ammonia generator, the LiBr-water condenser being configured for receiving the water vapor-liquid mixture and condensing remaining water vapor into condensed water. The LiBr-water condenser outputs thermal energy into the ambient environment. A vapor-liquid separator is in fluid communication with the LiBr-water condenser through a throttling valve, such that the vapor-liquid separator separates the water vapor from liquid water from the water vapor-liquid mixture, the liquid water being divided into first and second portions of throttled water. A first LiBr-water evaporator is further provided such that an aqua-ammonia condenser is in fluid communication with the first LiBr-water evaporator, the first LiBr-water evaporator being configured to receive the first portion of the throttled water from the vapor-liquid separator. The aqua-ammonia condenser is configured to receive the ammonia vapor from the aqua-ammonia generator and condense the ammonia vapor into condensed ammonia by thermal exchange with the first portion of the throttled water. Similarly, a second LiBr-water evaporator is provided such that an aqua-ammonia absorber is in fluid communication with the second LiBr-water evaporator, the second LiBr-water evaporator being configured to receive the second portion of the throttled water from the vapor-liquid separator.

A vapor-liquid heat exchanger is configured for receiving the condensed ammonia, and an aqua-ammonia evaporator is configured for receiving a throttled, sub-cooled vapor-liquid mixture of ammonia from the vapor-liquid heat exchanger. The aqua-ammonia evaporator is configured for producing refrigeration by heat exchange between the throttled ammonia and the ambient environment, the aqua-ammonia evaporator being configured for producing saturated ammonia vapor for input to the vapor-liquid heat exchanger for superheating thereof. The aqua-ammonia absorber is configured for receiving the superheated ammonia vapor for heat exchange with the second portion of the throttled liquid water to produce the aqua-ammonia solution having the first ammonia concentration (i.e., the high concentration ammonia liquor), which is pumped back into the aqua-ammonia generator via an aqua-ammonia liquid-liquid heat exchanger.

A LiBr-water absorber is configured for receiving the first portion of the saturated water vapor output from the first LiBr-water evaporator, the second portion of the saturated water vapor output from the second LiBr-water evaporator, and the saturated water vapor output from the vapor-liquid separator. The LiBr-water absorber is further configured for removing thermal energy therefrom by heat exchange with the ambient environment, and for further receiving the LiBr-water solution having the second LiBr concentration and mixing the LiBr-water solution having the second LiBr concentration with the saturated water vapor output from the vapor-liquid separator and from the first and second LiBr-water evaporators to generate the LiBr-water solution having the first LiBr concentration (i.e., the low concentration LiBr liquor), which is fed into the solar powered LiBr-water generator by passing through the LiBr-water liquid-liquid heat exchanger, restarting the cycle.

These and other features of the present invention will become readily apparent upon further review of the following specification.

BRIEF DESCRIPTION OF THE DRAWINGS

The sole drawing FIGURE diagrammatically illustrates a hybrid aqua-ammonia and lithium bromide-water absorption chiller according to the present invention.

DETAILED DESCRIPTION OF THE PREFERRED EMBODIMENTS

The hybrid aqua-ammonia and LiBr-water absorption chiller can produce evaporator temperatures below the freezing point of water (which conventional LiBr-water systems alone cannot do, since water is used as the refrigerant in such systems) at comparatively much lower operating pressures and lower generator temperatures (than an aqua-ammonia system alone requires to produce temperatures below the freezing point of water), thereby overcoming the limitations of both systems when powered by solar energy.

In the following example, a refrigeration temperature of $-9°$ C. is generated in an environment having an ambient temperature of $40°$ C. In operation, as shown in the sole drawing FIGURE, a solar collector 12 is in fluid communication with a lithium bromide (LiBr)-water generator 14. A relatively weak LiBr-water solution (i.e., a weak LiBr liquor) enters the generator 14, and after heat transfer with the solar collector 12 and subsequent evaporation of water in the solution, exits the generator 14 with a higher LiBr concentration (i.e., as a strong LiBr liquor). In the present example, the Li—Br water generator 14 operates at a temperature of approximately $85°$ C., approximately $45°$ C. higher than the ambient temperature. Water vapor generated in LiBr-water generator 14 is collected and passed through an aqua-ammonia generator 16 to a LiBr-water condenser 18. It should be understood that any suitable type of solar collector and lithium bromide-water generator may be utilized. Examples are shown in U.S. Pat. Nos. 4,311,024 and 4,327,555, each of which is hereby incorporated by reference in its entirety.

The aqua-ammonia generator 16 operates at the ambient temperature ($40°$ C. in the present example), which allows the water vapor from the LiBr-water generator 14 to be used to heat the aqua-ammonia generator 16. The LiBr-water condenser 18 transfers heat to the ambient environment, so it operates (in the present example) at a temperature approximately $5°$ C. higher than ambient temperature.

The condensed water produced by the LiBr-water condenser 18 passes through a throttling valve 20, to be converted into a vapor-liquid mixture, and then enters a vapor-liquid separator 48. The throttled liquid portion from the vapor-liquid separator 48 is then divided into two paths 22a and 22b, respectively. As shown in the FIGURE, the throttled water following path 22a passes to a first LiBr-water evaporator 24b, and the throttled water following path 22b passes to a second LiBr-water evaporator 26b. The evaporation of the first portion of the throttled liquid water inside the first LiBr-water evaporator 24b takes place by taking in the heat of condensation from a connected aqua-ammonia condenser 24a. Similarly, the evaporation of the second portion of the throttled liquid water inside the second LiBr-water evaporator 26b takes place by taking in the heat of absorption from a connected aqua-ammonia absorber 26a. The evaporation of the overall LiBr-water system takes place at a temperature of approximately $11°$ C. Thus, condensation and absorption of the aqua-ammonia system takes place at a temperature $2°$ C. higher than the evaporation temperature of the LiBr-water system.

The throttled water following path 22a passes through the first LiBr-water evaporator 24b and is input to the LiBr-water absorber 28. The throttled water following path 22b passes through the second LiBr-water evaporator 26b and is output to combine with the saturated water vapor flowing out of the first LiBr-water evaporator 24b, both being mixed with the throttled water vapor coming from the vapor-liquid separator 48 to be input to the LiBr-water absorber 28. The LiBr-water absorber 28 rejects heat to the ambient environment. The strong LiBr-water liquor output from the LiBr-water generator 14 passes through a liquid-liquid heat exchanger (LLHX) 30 (and throttling valve 32), where it is fed into the LiBr-water absorber 28. The strong LiBr-water liquor absorbs the saturated water vapor coming into the absorber 28 and becomes the weak LiBr-water liquor. The weak LiBr-water liquor is pumped by pump 34 back to the LiBr-water generator 14 through the liquid-liquid heat exchanger 30. Thus, the LiBr-water system causes the aqua-ammonia system to be operated at very low condensation temperatures, very low absorption temperatures, and a generation temperature equal to the ambient temperature. Although heat is provided to the LiBr-water generator 14 by the solar collector 12, no solar energy is required to provide heat to the aqua-ammonia generator 16. Rather, the water vapor coming from the LiBr-water generator 14 provides the required heat to the aqua-ammonia generator 16 for its operation.

Since the condenser pressure in the aqua-ammonia condenser 24a is a direct function of condenser temperature, by operating the condenser 24a at such low temperatures, the aqua-ammonia system is also operated at very low operating pressures. In the present example, the operating pressure of the aqua-ammonia condenser 24a is approximately 6.7 bars.

A strong aqua-ammonia liquor enters the aqua-ammonia generator 16, takes in heat from the condensing water vapor, and becomes a weak aqua-ammonia liquor by generating ammonia vapor. The operation of the aqua-ammonia generator 16 at such low generator pressures and temperatures causes pure ammonia vapor to be generated. Thus, no rectifier or dephlegmator are required (as in conventional aqua-ammonia generator systems). The pure ammonia vapor is passed to the aqua-ammonia condenser 24a and undergoes condensation by rejecting heat to the evaporating water vapor inside the first LiBr-water evaporator 24b.

Following condensation of the ammonia, the condensed ammonia passes to a vapor-liquid heat exchanger (VLHX) 36, where it is sub-cooled and then enters into a throttling valve 38, where its pressure is reduced so that the required refrigeration effect can be obtained at the required evaporator temperature inside an aqua-ammonia evaporator 40. The saturated ammonia vapor from the aqua-ammonia evaporator 40 then flows into the vapor-liquid heat exchanger 36, where it is superheated, and then passes into the aqua-ammonia absorber 26a. The absorption of superheated ammonia vapor takes place inside the absorber 26a with the weak aqua-ammonia liquor coming from the aqua-ammonia liquid-liquid heat exchanger 44 through a throttling valve 46. The heat of absorption inside the absorber 26a is rejected to the evaporating water vapor in the second LiBr-water evaporator 26b. Following the absorption process, the strong aqua-ammonia liquid is pumped by pump 42 back to the aqua-ammonia generator 16 by passing through a liquid-liquid heat exchanger 44. The aqua-ammonia liquid-liquid heat exchanger 44 reduces the temperature of the weak aqua-ammonia liquor by rejecting heat to the strong aqua-ammonia liquor.

In the present example, an evaporator temperature of −9° C. is generated at the aqua-ammonia evaporator 40 in an ambient environment having a temperature of 40° C. This process is initiated by a solar-powered generator operating at a temperature of 85° C., compared to a conventional absorption system where the solar input is required to have a temperature of at least 125° C. The highest pressure in the system 10 is approximately 6.7 bar, compared to a conventional system having pressures as high as 17.7 bar. It should be understood that any suitable type of aqua-ammonia generator, condenser and absorber may be utilized. Examples of such are shown in U.S. Pat. Nos. 5,548,971 and 6,718,792, each of which is hereby incorporated by reference in its entirety.

It is to be understood that the present invention is not limited to the embodiments described above, but encompasses any and all embodiments within the scope of the following claims.

We claim:
1. A hybrid aqua-ammonia and lithium bromide-water absorption chiller, comprising:
 a LiBr-water generator;
 an LiBr-water solution received by the LiBr-water generator, the LiBr-water solution having a first LiBr concentration, the LiBr-water generator evaporates water from the LiBr-water solution having the first LiBr concentration to output water vapor and an LiBr-water solution having a second LiBr concentration, the second LiBr concentration being greater than the first LiBr concentration;
 an aqua-ammonia generator in fluid communication with the LiBr-water generator, the aqua-ammonia generator receives the water vapor, extracting thermal energy therefrom to partially condense the water vapor, and outputs a water vapor-liquid mixture;
 an aqua-ammonia solution having a first ammonia concentration, the aqua-ammonia generator evaporates ammonia from the aqua-ammonia solution and outputs ammonia vapor and an aqua-ammonia solution having a second ammonia concentration, the second ammonia concentration being lower than the first ammonia concentration;
 a LiBr-water condenser in fluid communication with the aqua-ammonia generator, the LiBr-water condenser receives the water vapor-liquid mixture and condenses remaining water vapor into condensed water, the LiBr-water condenser outputs thermal energy into the ambient environment;
 a vapor-liquid separator in fluid communication with the LiBr-water condenser through a throttling valve, the vapor-liquid separator separates the water vapor from liquid water from the water vapor-liquid mixture, the liquid water being divided into first and second portions of throttled water;
 a first LiBr-water evaporator;
 an aqua-ammonia condenser in thermal communication with the first LiBr-water evaporator, the first LiBr-water evaporator receives the first portion of the throttled water from the vapor-liquid separator, the aqua-ammonia condenser receives the ammonia vapor from the aqua-ammonia generator and condense the ammonia vapor into condensed ammonia by thermal exchange with the first portion of the throttled water;
 a second LiBr-water evaporator;
 an aqua-ammonia absorber in thermal communication with the second LiBr-water evaporator, the second LiBr-water evaporator receives the second portion of the throttled water from the vapor-liquid separator;
 a vapor-liquid heat exchanger receives the condensed ammonia;
 an aqua-ammonia evaporator receives a throttled, sub-cooled vapor-liquid mixture of ammonia from the vapor-liquid heat exchanger, the aqua-ammonia evaporator produces refrigeration by heat exchange between the throttled ammonia and the ambient environment, the aqua-ammonia evaporator produces saturated ammonia vapor for input to the vapor-liquid heat exchanger for superheating thereof, the aqua-ammonia absorber receives the superheated ammonia vapor for heat exchange with the second portion of the throttled liquid water to produce the aqua-ammonia solution having the first ammonia concentration; and a LiBr-water absorber receives the first portion of the saturated water vapor output from the first LiBr-water evaporator, the second portion of the saturated water vapor output from the second LiBr-water evaporator and the saturated water vapor output from the vapor-liquid separator, the LiBr-water absorber removes thermal energy therefrom by heat exchange with the ambient environment, the LiBr-water absorber further receives the LiBr-water solution having the second LiBr concentration and mixing the LiBr-water solution having the second LiBr concentration with the saturated water vapor output from the vapor-liquid separator and from the first and second LiBr-water evaporators to generate the LiBr-water solution having the first LiBr concentration.

2. The hybrid aqua-ammonia and lithium bromide-water absorption chiller as recited in claim 1, wherein the LiBr-water generator is solar-powered.

3. The hybrid aqua-ammonia and lithium bromide-water absorption chiller as recited in claim 1, further comprising a second throttling valve, said second throttling valve reduces pressure of the sub-cooled condensed ammonia prior to input thereof to the aqua-ammonia evaporator.

4. The hybrid aqua-ammonia and lithium bromide-water absorption chiller as recited in claim 1, further comprising a first liquid-liquid heat exchanger, said first liquid-liquid heat exchanger transfers thermal energy from the aqua-ammonia solution having the second ammonia concentration output from the aqua-ammonia generator to the aqua-ammonia solution having the first ammonia concentration prior to input to the aqua-ammonia generator.

5. The hybrid aqua-ammonia and lithium bromide-water absorption chiller as recited in claim 4, further comprising a first pump, said first pump pumps the aqua-ammonia solution having the first ammonia concentration from the aqua-ammonia absorber to the first liquid-liquid heat exchanger.

6. The hybrid aqua-ammonia and lithium bromide-water absorption chiller as recited in claim 5, further comprising a second liquid-liquid heat exchanger, said second liquid-liquid heat exchanger exchanges heat between the LiBr-water solution having the first LiBr concentration and the LiBr-water solution having the second LiBr concentration.

7. The hybrid aqua-ammonia and lithium bromide-water absorption chiller as recited in claim 6, further comprising a second pump, said second pump pumps the LiBr-water solution having the first LiBr concentration to the second liquid-liquid heat exchanger.

8. A hybrid aqua-ammonia and lithium bromide-water absorption chiller, comprising:

a LiBr-water generator;

an LiBr-water solution received by the LiBr-water generator, the LiBr-water solution having a first LiBr concentration, the LiBr-water generator evaporates water from the LiBr-water solution having the first LiBr concentration to output water vapor and an LiBr-water solution having a second LiBr concentration, the second LiBr concentration being greater than the first LiBr concentration;

an aqua-ammonia generator in fluid communication with the LiBr-water generator, the aqua-ammonia generator receives the water vapor, extracting thermal energy therefrom to partially condense the water vapor, and outputs a water vapor-liquid mixture;

an aqua-ammonia solution having a first ammonia concentration, the aqua-ammonia generator evaporates ammonia from the aqua-ammonia solution and outputs ammonia vapor and an aqua-ammonia solution having a second ammonia concentration, the second ammonia concentration being lower than the first ammonia concentration;

a LiBr-water condenser in fluid communication with the aqua-ammonia generator, the LiBr-water condenser receives the water vapor-liquid mixture and condenses remaining water vapor into condensed water, the LiBr-water condenser outputs thermal energy into the ambient environment;

a vapor-liquid separator in fluid communication with the LiBr-water condenser through a throttling valve, the vapor-liquid separator separates the water vapor from liquid water from the water vapor-liquid mixture, the liquid water being divided into first and second portions of throttled water;

a first LiBr-water evaporator;

an aqua-ammonia condenser in thermal communication with the first LiBr-water evaporator, the first LiBr-water evaporator receives the first portion of the throttled water from the vapor-liquid separator, the aqua-ammonia condenser receives the ammonia vapor from the aqua-ammonia generator and condense the ammonia vapor into condensed ammonia by thermal exchange with the first portion of the throttled water;

a second LiBr-water evaporator;

an aqua-ammonia absorber in thermal communication with the second LiBr-water evaporator, the second LiBr-water evaporator receives the second portion of the throttled water from the vapor-liquid separator;

a vapor-liquid heat exchanger receives the condensed ammonia;

an aqua-ammonia evaporator receives a throttled, sub-cooled vapor-liquid mixture of ammonia from the vapor-liquid heat exchanger, the aqua-ammonia evaporator produces refrigeration by heat exchange between the throttled ammonia and the ambient environment, the aqua-ammonia evaporator produces saturated ammonia vapor for input to the vapor-liquid heat exchanger for superheating thereof, the aqua-ammonia absorber receives the superheated ammonia vapor for heat exchange with the second portion of the throttled liquid water to produce the aqua-ammonia solution having the first ammonia concentration;

a first liquid-liquid heat exchanger, said first liquid-liquid heat exchanger transfers thermal energy from the aqua-ammonia solution having the second ammonia concentration output from the aqua-ammonia generator to the aqua-ammonia solution having the first ammonia concentration prior to input to the aqua-ammonia generator; and a LiBr-water absorber receives the first portion of the saturated water vapor output from the first LiBr-water evaporator, the second portion of the saturated water vapor output from the second LiBr-water evaporator and the saturated water vapor output from the vapor-liquid separator, the LiBr-water absorber removes thermal energy therefrom by heat exchange with the ambient environment, the LiBr-water absorber further receives the LiBr-water solution having the second LiBr concentration and mixing the LiBr-water solution having the second LiBr concentration with the saturated water vapor output from the vapor-liquid separator and from the first and second LiBr-water evaporators to generate the LiBr-water solution having the first LiBr concentration.

9. The hybrid aqua-ammonia and lithium bromide-water absorption chiller as recited in claim 8, wherein the LiBr-water generator is solar-powered.

10. The hybrid aqua-ammonia and lithium bromide-water absorption chiller as recited in claim 8, further comprising a second throttling valve, said second throttling valve reduces pressure of the sub-cooled condensed ammonia prior to input thereof to the aqua-ammonia evaporator.

11. The hybrid aqua-ammonia and lithium bromide-water absorption chiller as recited in claim 10, further comprising a second liquid-liquid heat exchanger, said second liquid-liquid heat exchanger exchanges heat between the LiBr-water solution having the first LiBr concentration and the LiBr-water solution having the second LiBr concentration.

12. The hybrid aqua-ammonia and lithium bromide-water absorption chiller as recited in claim 11, further comprising a second pump, said second pump pumps the LiBr-water solution having the first LiBr concentration to the second liquid-liquid heat exchanger.

* * * * *